US009215053B2

(12) United States Patent
Jöngren et al.

(10) Patent No.: US 9,215,053 B2
(45) Date of Patent: *Dec. 15, 2015

(54) MAPPING USER DATA ONTO A TIME-FREQUENCY RESOURCE GRID IN A COORDINATED MULTI-POINT WIRELESS COMMUNICATION SYSTEM

(71) Applicant: Telefonaktiebolaget L M Ericsson (publ), Stockholm (SE)

(72) Inventors: George Jöngren, Sundbyberg (SE); Erik Dahlman, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/341,941

(22) Filed: Jul. 28, 2014

(65) Prior Publication Data
US 2014/0334437 A1 Nov. 13, 2014

Related U.S. Application Data

(63) Continuation of application No. 13/148,169, filed as application No. PCT/SE2009/051045 on Sep. 21, 2009, now Pat. No. 8,837,396.

(60) Provisional application No. 61/151,293, filed on Feb. 10, 2009.

(51) Int. Cl.
*H04L 5/00* (2006.01)
*H04B 7/02* (2006.01)

(52) U.S. Cl.
CPC .............. *H04L 5/0053* (2013.01); *H04B 7/024* (2013.01); *H04L 5/0005* (2013.01); *H04L 5/0032* (2013.01); *H04L 5/0062* (2013.01); *H04L 5/0096* (2013.01)

(58) Field of Classification Search
CPC ... H04L 5/0032; H04L 5/0062; H04L 5/0096; H04L 5/0005; H04L 5/0053; H04B 7/024
USPC .................................................. 370/329, 332
See application file for complete search history.

(56) References Cited

U.S. PATENT DOCUMENTS

2008/0310364 A1* 12/2008 Lu et al. .................... 370/330
2011/0237270 A1   9/2011 Noh et al.
(Continued)

FOREIGN PATENT DOCUMENTS

| JP | 2012090350 A | 5/2012 |
| JP | 2012510772 A | 5/2012 |
| JP | 2012531858 A | 12/2012 |

OTHER PUBLICATIONS

Huawei CMCC, Discussions on the Downlink Coordinated Transmission-Impact on the Radio Interface, Jan. 12-16, 2009, 3GPP TSG RAN WG1, R1-090129, Meeting #55bis, #pp. 8.*

(Continued)

*Primary Examiner* — Jae Y Lee
*Assistant Examiner* — Jean F Voltaire
(74) *Attorney, Agent, or Firm* — Coats & Bennett, PLLC

(57) ABSTRACT

Methods and apparatus are disclosed for receiving user data in a wireless communication system that employs coordinated multi-point transmission of the user data from a first cell serving a wireless terminal and a second cell site neighboring the first cell site. In an exemplary system, the first cell site maps control signals and user data to a time-frequency resources according to a first mapping pattern, while the second cell site maps control data and traffic data to the time-frequency resources according to a second mapping pattern. An exemplary method comprises extracting user data, according to the first mapping pattern, from time-frequency resources of a first transmission for the wireless terminal transmitted from the first cell site; detecting a control element transmitted by one of the first and second cell sites, the control element indicating that user data associated with the control element is mapped to the time-frequency resources according to the second mapping pattern; and, responsive to said detecting, extracting user data according to the second mapping pattern from time-frequency resources of a second transmission for the wireless terminal transmitted from the second cell site.

20 Claims, 7 Drawing Sheets

(56) References Cited

U.S. PATENT DOCUMENTS

2012/0099547 A1 4/2012 Wan et al.
2012/0106610 A1 5/2012 Nogami et al.

OTHER PUBLICATIONS

ZTE, Consideration on Comp antenna port mapping in LTE-A, Sep. 29-Oct. 3, 2008, 3GPP TSG RAN WG1, R1-083611, Meetings #55bis, #pp. 7.*
3GPP, Huawei, CMCC, Further Discussions on the Downlink Coordinated Transmission-Impact on the Radio Interference, Dated Jan. 12-19, 2009, #pp. 8.*
3GPP, ZTE, Consideration on Comp antenna port mapping in LTE-A, Dated Sep. 29-Oct. 3, 2008, #pp. 7.*
Huawei (Further Discussions on the Downlink Coordinated Transmission-Impact on the Radio Interference, Dated Jan. 12-16, 2009).*
ZTE (Consideration on Comp antenna port mapping in LTE-A, Dated Sep. 29-Oct. 3, 2008).*
Huawei, et al., "Further Discussions on the Downlink Coordinated Transmission—Impact on the Radio Interface", 3GPP TSG RAN WG1 Meeting #55bis, Ljubljana, Slovenia, Jan. 12, 2009, pp. 1-8, R1-090129, 3GPP.
ZTE, "Consideration on Comp antenna port mapping in LTE-A", 3GPP TSG RAN WG1 Meeting #54bis, Prague, Czech Republic, Sep. 29, 2008, pp. 1-7, R1-083611, 3GPP.
Ericsson, "Downlink CoMP", TSG-RAN WG1 #56, Athens, Greece, Sep. 2, 2009, pp. 1-3, R1-090914, 3GPP.
3RD Generation Partnership Project, "TR 36.814 v.0.3.2 Further Advancements for E-UTRA Physical Layer Aspects", 3GPP TSG RAN WG Meeting #56, Feb. 9-13, 2009, Athens, Greece, R1-090929.
Huawei et al., "Solutions for DL CoMP Transmission—for Issues on Control Zone, CRS and DRS", 3GPP TSG RAN WG1 meeting #56, Feb. 9, 2009, pp. 1-9, Athens, Greece, R1-090821, 3GPP.
ZTE, "Resource Mapping Issues on JP transmission in CoMP", TSG-RAN WG1 Meeting #55bis, Ljubljana, Slovenia, Jan. 12, 2009, pp. 1-3, R1-090070, 3GPP.
Samsung, "Design Considerations for Comp Joint Transmission", 3GPP TSG RAN WG1 Meeting #57, San Francisco, USA, May 4, 2009, pp. 1-10, R1-091868, 3GPP.

* cited by examiner

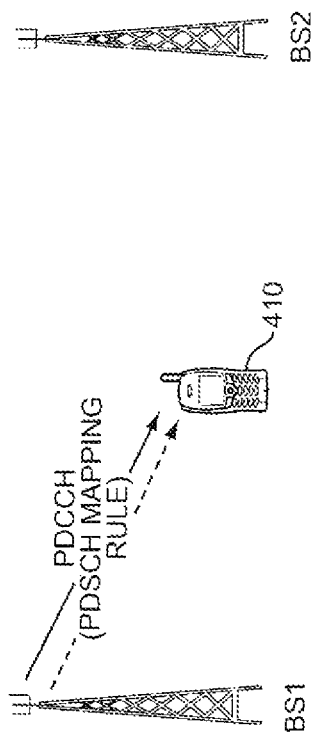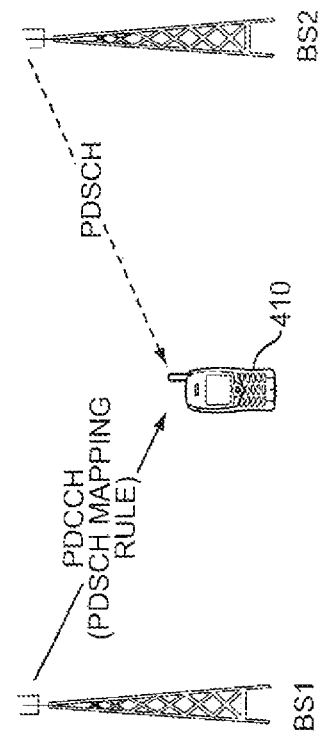
FIG. 4A
FIG. 4B

MAPPING USER DATA ONTO A TIME-FREQUENCY RESOURCE GRID IN A COORDINATED MULTI-POINT WIRELESS COMMUNICATION SYSTEM

RELATED APPLICATIONS

This application is a continuation application of pending U.S. application Ser. No. 13/148,169, filed 5 Aug. 2011, which is a National Phase of International Application PCT/SE2009/051045 filed 21 Sep. 2009, which in turn claims priority to U.S. Provisional Application No. 61/151,293, filed 10 Feb. 2009. The Applicants incorporate the disclosures of each of these references in their entireties by reference herein.

TECHNICAL FIELD

The present invention generally relates to wireless telecommunication systems, and more particularly relates to the mapping of user data onto an Orthogonal Frequency-Division Multiplexing (OFDM) resource grid in a wireless communication system utilizing coordinated multi-point transmissions.

BACKGROUND

In the so-called Long-Term Evolution (LTE) systems currently under development by members of the $3^{rd}$-Generation Partnership Project (3GPP), downlink transmissions are specified according to an Orthogonal Frequency-Division Multiple Access (OFDMA) scheme. Hence, the available physical resources in the downlink are divided into a time-frequency grid. Generally speaking, the time dimension of the downlink physical resource allocated to a particular base station (an Evolved Node B, or eNodeB, in 3GPP terminology) is divided into subframes of one millisecond each; each subframe includes a number of OFDM symbols. For a normal cyclic prefix length, suitable for use in environments where multipath dispersion is not expected to be extremely severe, a subframe consists of fourteen OFDM symbols. A subframe consists of twelve OFDM symbols if an extended cyclic prefix is used. In the frequency domain, the physical resources allocated to a given eNodeB are divided into adjacent OFDM subcarriers, at a spacing of fifteen kilohertz, with the precise number of subcarriers varying according to the allocated system bandwidth. For purposes of scheduling resources (i.e., allocating resources for use by a given mobile station), the downlink time-frequency resources are referenced in units called "resource blocks" (RBs); each resource block spans twelve adjacent subcarriers and one-half of one subframe. The term "resource block pair" refers to two consecutive resource blocks, i.e., occupying an entire one-millisecond subframe.

The smallest element of the LTE time-frequency grid, i.e., one subcarrier of one OFDM symbol, is called a resource element. There are several different types of resource elements, including resource elements used as reference signals (RS) as well as resource elements for carrying data symbols (e.g., coded information carrying symbols). The reference signals enable channel estimation, which can be used for coherent demodulation of the received signals and may also be used for various measurements. Each reference signal defines a so-called antenna port—since a specific RS is used for each port, a given antenna port is visible to mobile stations (user equipment, or UEs, in 3GPP terminology) as a separate channel. However, an antenna port is a logical entity that may or may not correspond to a single physical antenna. Thus, when an antenna port corresponds to multiple physical antennas, the same reference signal is transmitted from all of the physical antennas.

Cell-specific reference signals (also known as common reference signals) as well as UE-specific reference signals (user-equipment-specific reference signals, also known as dedicated reference signals) are supported in the current LTE specifications. At a given eNodeB, either 1, 2, or 4 cell-specific reference signals may be configured. However, only one UE-specific reference signal is available under the current specifications.

FIG. 1 illustrates a portion of the LTE time-frequency grid for the cases of 1, 2, and 4 cell-specific antenna ports (which may correspond, for example, to eNodeB's using 1, 2, and 4 transmit antennas, respectively). More particularly, FIG. 1 illustrates a resource block pair, i.e., twelve subcarriers over a single subframe, for each antenna port. The structure illustrated in FIG. 1 is generally repeated over the entire system bandwidth.

In FIG. 1, reference symbols 110 are high-lighted in the illustration of the resource block pair for the case of antenna port 1. Other reference symbols, for the additional antenna ports, are shaded but not high-lighted in each of the various grids. Thus, as can be seen, the reference signals for the different antenna ports are carried in OFDM symbols 0, 4, 7, and 11 (i.e., the first and fifth symbols of each of the two slots in the subframe), for one and two antenna ports. The four-port case includes additional reference symbols in OFDM symbols 1 and 8 as well.

At any given eNodeB, the actual resource grid may look slightly different from what is illustrated in FIG. 1 in that the reference-signal pattern may be shifted in frequency by an integer number of subcarriers. The specific shift depends on the cell identifier (ID); the number of unique shifts available depends on the number of cell-specific antenna ports that are configured. A close examination of FIG. 1 will reveal that there are six shifts yielding unique reference symbol patterns in the case of one cell-specific antenna port. Configurations for two and four cell-specific antenna ports will each support three different shifts, as there is, in these cases, a 3-sub-carrier frequency shift between reference symbols of different antenna ports.

Such frequency shifts serve at least two purposes. First, they enable more effective power boosting of resource elements used for reference signals, since these resource elements for adjacent cells are less likely to collide. Secondly, for purposes of channel-quality measurements, shifting allows the inter-cell interference to be measured for the reference-signal resource elements. Since the so-obtained interference is a mixture of reference-signal interference and data interference from other cells, such measurements thus take into account the load of interfering cells, at least to some extent.

As previously mentioned, UE-specific reference signals are also supported in the current LTE specifications. The pattern for a UE-specific reference is illustrated in FIG. 2, which also illustrates additional details of the layout of a resource block pair. As seen in FIG. 2, a resource-block pair comprises a twelve-subcarrier-by-fourteen-symbol grid of resource elements 220 (for the case of a normal length cyclic prefix), or two resource blocks together occupying a subframe 210. The subframe 210 in turn comprises an even-numbered slot 212 and an odd-numbered slot 214. The first one, two, three, or four symbols of the subframe are used for a control-channel region 240 (which may carry one or multiple Physical Downlink Control Channels, or PDCCHs); the resource block illustrated in FIG. 2 is configured with two symbols dedicated to the control-channel region 240. UE-specific reference symbols 230 are also illustrated in FIG. 2; these reference symbols appear in OFDM symbols 3, 6, 9, and 12. The UE-specific reference signal effectively defines a fifth antenna port.

The UE-specific reference signal is only associated with those resource-block pairs allocated for a particular Physical Downlink Shared Channel (PDSCH) transmission that relies on such reference signals (i.e., those transmissions that are mapped to antenna port 5). Thus, the reference symbols corresponding to a UE-specific reference signal are not necessarily transmitted in every subframe, or for all resource block pairs within one subframe. Unlike the cell-specific reference signals, precoding may be applied to UE-specific reference signals in the same manner as it may be applied to data-carrying resource elements. This makes such precoding effectively invisible to the mobile station, in the sense that any precoding will effectively be included in the channel estimates derived by means of the UE-specific reference signals. UE-specific reference signals thus provide enhanced flexibility in mapping a data transmission to different antenna configurations. In particular, the use of UE-specific reference signals facilitates the mapping of a particular downlink transmission to antennas spread out over different sites.

Data over the PDSCH is transmitted to a given mobile station using resource elements that correspond to the resource block pairs allocated to that mobile station for a given subframe. The particular resource block pairs involved in the transmission are dynamically selected and signaled to the mobile station as part of the resource-allocation content of the associated control channel, PDCCH, transmitted in the control-channel region of the subframe. As is apparent from FIGS. 1 and 2, some of the OFDM symbols outside of the control-channel region are used to carry reference symbols; hence, not all resource elements in that portion of the resource block pair can be used for PDSCH transmission. In other words, the mapping of PDSCH onto the resource grid is affected by the positions of the cell-specific reference symbols.

In a classical cellular deployment, the intended service area is covered by several cell sites at different geographical positions. Each site has one or more antennas servicing an area around the site. Often, a cell site is further subdivided into multiple sectors, where perhaps the most common case is to use three 120-degree-wide sectors. Such a scenario is illustrated in FIG. 3. Each sector forms a cell, and a base station associated with that cell is controlling and communicating with the mobile stations within that cell. In a conventional system, the scheduling and transmissions to mobile stations and reception from the mobile stations are to a large degree independent from one cell to another.

Differing simultaneous transmissions on the same frequencies in different cells close to each other will naturally interfere with each other and thus lower the quality of the reception of the different transmissions at a receiving mobile terminal. Interference is a major obstacle in cellular networks and is primarily controlled in conventional deployment scenarios by planning the network carefully, placing the sites at appropriate locations, tilting the antennas etc.

Performing independent scheduling between different cells has the advantages of being simple and requiring relatively modest communication capabilities between different sites. On the other hand, the cells affect each other in that signals originating from one cell are seen as interference in nearby cells. This indicates that there are potential benefits in coordinating the transmissions from nearby cells. In various cellular systems, separating transmissions in frequency and/or time between neighboring cell sites is commonly used to reduce interference. However, this separation has historically been statically configured. More recently, separation in the spatial domain, e.g., by means of advanced multi-antenna transmission schemes, has also been widely exploited, and coordination of neighboring transmissions in the time, frequency, and spatial domains has been proposed to mitigate interference. Such coordination has recently received substantial interest in both academic literature and standardization of new wireless technologies. In fact, so-called coordinated multi-point transmission (COMP), see 3GPP TR 36.814 v0.3.2 (R1-090929) is considered one of the key technology components for the upcoming release 10 of LTE (LTE-Advanced).

COMP may be classified into two separate but related technologies: coordinated scheduling and joint transmission, respectively. In the former case, the transmission to a given mobile station originates at a single cell site or sector at a time, while in the latter case multiple sites and/or sectors are simultaneously involved in the transmission. Thus, for example, several cell sites covering a group of cells, such as the group of seven circles inside the circle of FIG. 3, may coordinate their transmissions; a group of cells involved in such a coordination is here referred to as a COMP cluster.

Obviously, coordination between cell sites requires communication between the sites. This can take many forms and the requirements on data rates and latency for such inter-site communication are to a large extent dependent on the exact coordination scheme being used.

Apart from the potential problem of site-to-site communication capability, coordination exploiting time and frequency is easily achieved for OFDM systems like LTE by using the normal dynamic resource allocation feature, which selects the particular resource-block pairs for transmitting the PDSCH to a given mobile station in a given subframe. Spatial coordination, on the other hand, involves utilizing multiple antennas for the transmission; this can include transmission from antennas at geographically distinct cell sites. By modeling the signals as vector-valued signals and applying appropriate complex-valued matrix weights among the transmitting antennas, the transmission can be focused in the direction (in physical space or in a more abstract vector space) of the mobile station, while minimizing the interference to other mobile stations. This approach increases the signal-to-noise-plus-interference ratio (SINR) at the mobile station, and ultimately improves the overall performance of the system.

As previously indicated, the mapping of PDSCH onto resource elements in the LTE time-frequency grid may vary from one cell to another, even if the same resource blocks are used for the PDSCH. One reason is the use of different reference-signal frequency shifts for the cell-specific reference signals. Another reason is that the number of OFDM symbols used for control signaling can vary dynamically from 1 up to the 4 first OFDM symbols and may be different for neighbor cells. Hence, the particular serving cell to which a given mobile station is attached affects the mapping of PDSCH to resource elements in the time-frequency resource grid, as this mapping is intended to be compatible with how other resources such as the reference signals and PDCCH are allocated in that particular cell. This may create problems for coordinated multi-point transmission, where certain transmissions to a mobile station need to be performed from sites/sectors other than the serving (logical) cell, whether simultaneously or as part of a coordinated schedule.

SUMMARY

Some of these problems may be mitigated, in some embodiments of the present invention, by enabling transmission of PDSCH (possibly including associated UE-specific reference signals) according to a resource mapping that is compatible with the mapping used in a cell other than the serving cell. Specifically, in these embodiments it is possible to use a mapping of PDSCH data symbols to the LTE time-frequency grid according to a pattern that corresponds to a reference-signal frequency shift different than that used by the serving cell (i.e., the cell to which the PDSCH is associated). In some embodiments, the mapping of the PDSCH data symbols to the LTE time-frequency grid may also be adjusted to accommodate a differently-sized control channel (e.g., to accommodate the fact that a neighboring cell uses three OFDM symbols for PDCCH, while the serving cell uses only two symbols).

In support of this approach, appropriate signaling may be added, in some embodiments, to support dynamic adaptation of the mentioned PDSCH mapping. More specifically, signaling may be added to inform a receiving mobile station about the mapping used for a particular PDSCH transmission. In other words, this additional signaling informs the mobile station of which of several possible PDSCH mappings that the mobile station should use when extracting PDSCH data symbols from the OFDM time-frequency grid and decoding the PDSCH. In some embodiments, this additional signaling could be part of the PDCCH, such as the part of the PDCCH carrying scheduling information for the mobile station.

Thus, embodiments of the invention include methods, such as may be implemented in a mobile station, for receiving user data in a wireless communication system that employs coordinated multi-point transmission of the user data from a first cell serving the wireless terminal and a second cell site neighboring the first cell site. In this system, the first cell site maps control signals and user data to a time-frequency resources according to a first mapping pattern, while the second cell site maps control data and traffic data to the time-frequency resources according to a second mapping pattern. The control signals may include common reference signals, UE-specific reference signals, synchronization signals, and the like.

An exemplary method includes extracting user data, according to the first mapping pattern, from time-frequency resources of a first transmission for the mobile station transmitted from the first cell site, detecting a control element transmitted by one of the first and second cell sites, the control element indicating that user data associated with the control element is mapped to the time-frequency resources according to the second mapping pattern, and, responsive to said detecting, extracting user data according to the second mapping pattern from time-frequency resources of a second transmission for the wireless terminal transmitted from the second cell site. In some embodiments, detecting the control element comprises decoding one or more bits of a received downlink resource allocation message. In some of these and other embodiments, the control element indicates one of a plurality of pre-determined shift patterns for common reference signals interspersed among time-frequency resources mapped to user data. In still other embodiments, the control element further indicates that the second mapping pattern maps user data to one or more fewer OFDM symbols than the first mapping pattern.

The techniques described herein may be applied to coordinated multi-point transmission using only coordinated scheduling, such as where the first and second transmissions discussed above are transmitted during first and second non-coincident transmission time intervals. Further, these techniques may be applied where the first and second transmissions are at least partially overlapping in time, in which case the methods summarized above may further comprise separating the first and second transmissions using one of space-time diversity processing or spatial de-multiplexing processing. In some embodiments, the control signals comprise user equipment-specific reference signals interspersed among time-frequency resources mapped to user data, in which case the methods summarized above may further comprise extracting the user equipment-specific reference signals from the second transmission according to the second mapping pattern.

Other embodiments include various wireless terminals, adapted for use in a wireless communication system employing coordinated multipoint transmission of user data, the wireless terminals including a receiver circuit configured to carry out one or more of the inventive techniques summarized above and disclosed in detail below. Further embodiments include a transmitting node for use in a first cell site in a wireless communication system using coordinated multi-point transmission of data, where the transmitting node includes a transmitter circuit configured to transmit a control element indicating that user data associated with the control element is mapped to the time-frequency resources according to a particular pre-determined mapping pattern. Methods corresponding to this transmitting node are also disclosed.

Of course, the present invention may be carried out in other ways than those specifically set forth herein without departing from essential characteristics of the invention. Upon reading the following description and viewing the attached drawings, the skilled practitioner will recognize that the described embodiments are illustrative and not restrictive, and that all changes coming within the meaning and equivalency range of the appended claims are intended to be embraced therein.

BRIEF DESCRIPTION OF THE DRAWINGS

FIGS. 4A and 4B illustrate transmissions from first and second cell sites to a mobile station in an LTE system utilizing coordinated multi-point transmission.

DETAILED DESCRIPTION

Figure 1:
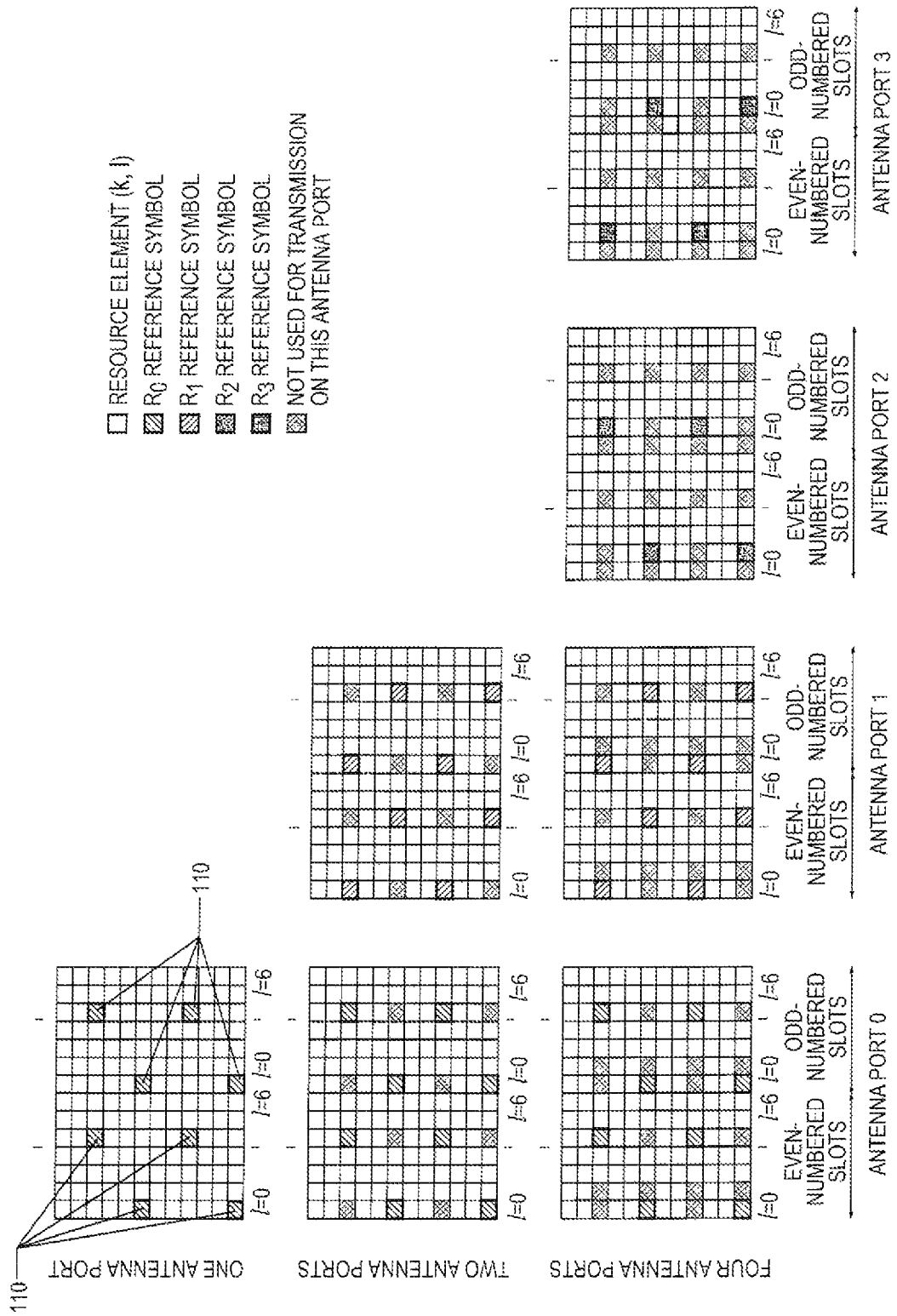
FIG. 1 illustrates the Long-Term Evolution (LTE) time-frequency resource grid when a normal cyclic prefix is used. The cases of one, two and four antenna ports are illustrated.
Figure 2:
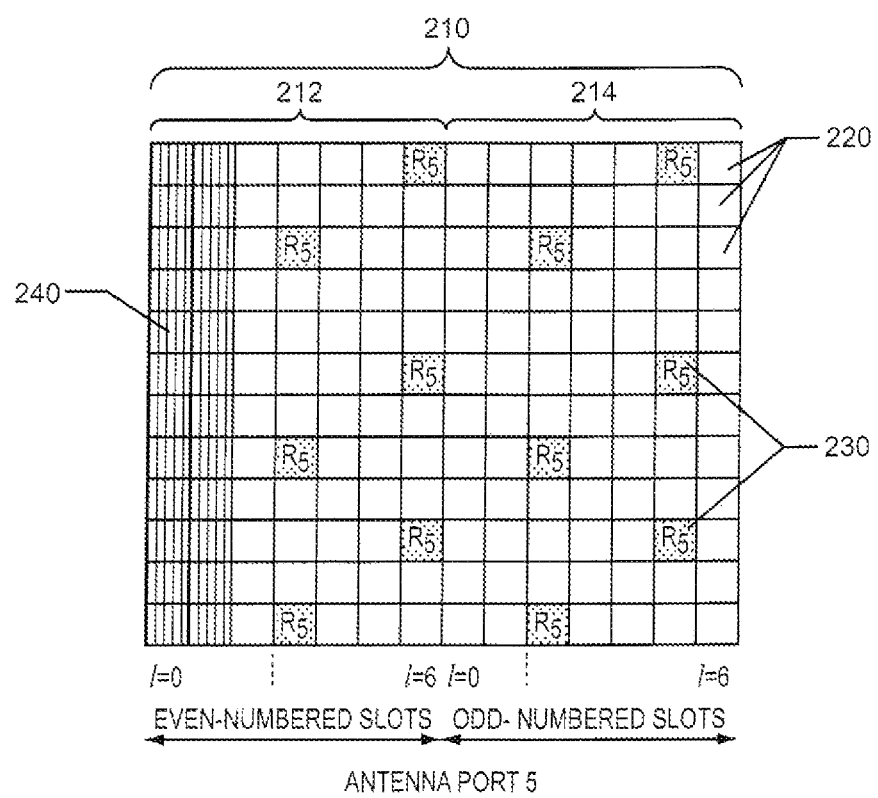
FIG. 2 illustrates a UE-specific reference signal in a resource block pair.
Figure 3:
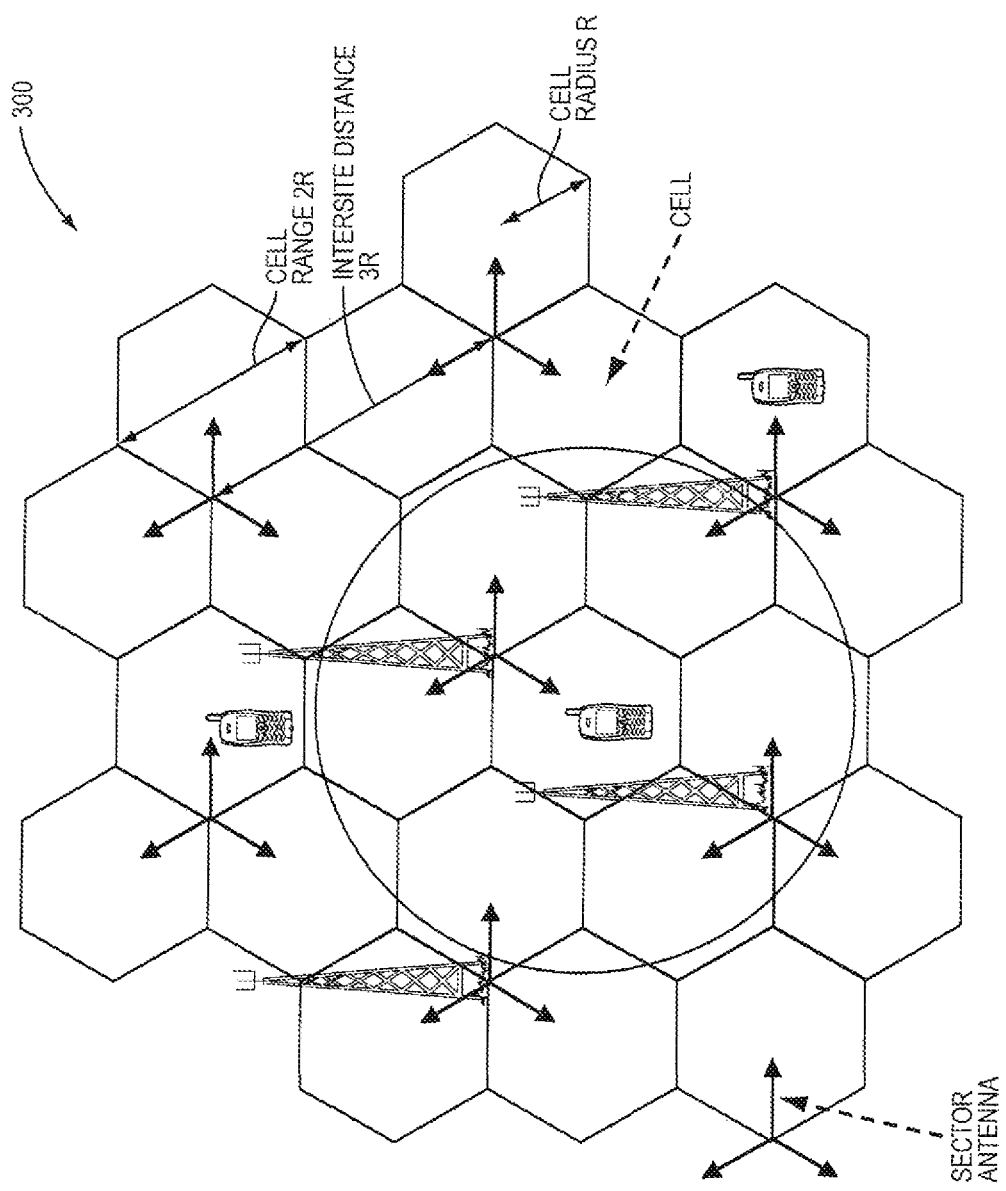
FIG. 3 illustrates an exemplary cellular network with three-sector sites.

Although aspects of the present invention are described herein in the context of a Long-Term Evolution (LTE) system, as specified by the $3^{rd}$-Generation Partnership Project (3GPP), those skilled in the art will appreciate that the inventive techniques disclosed herein may be used in other wireless systems. Thus, although terminology from the 3GPP LTE specifications is used throughout the disclosure, this terminology should not be seen as limiting the scope of the invention to only the aforementioned system. Other wireless systems, including WCDMA, WiMax, UMB and GSM, may also be adapted to exploit the techniques described below. Indeed, it should also be noted that the use of terms such as base station, eNodeB, mobile station, and UE should also be considering non-limiting in the sense that their use herein need not imply that the present inventive techniques are only applicable in systems employing the hierarchical architecture of the 3GPP LTE system. Thus, when the methods and apparatus of the present disclosure are adapted to other systems, the apparatus referred to herein as "base station" or eNodeB may correspond to a user device or other wireless terminal, e.g., "device 1", while the apparatus described herein as a "mobile station" or "UE" may refer to another wireless terminal, e.g., "device 2," with these two devices communicating with each other over any suitable radio channel.

Nevertheless, the inventive techniques of the present invention are most readily understood with reference to an LTE system utilizing coordinated multi-point (COMP) transmission, where user data is transmitted to a mobile station from a first cell site (e.g., a first eNodeB) that serves the mobile station as well as from a second cell site that neighbors the first cell site. As discussed above, the first cell site may map control signals, especially reference signals, to the LTE time-frequency resource grid according to a first mapping pattern, while the second cell site maps control signals to the resource grid according to a second mapping pattern, differing from the first mapping pattern.

For example, consider a scenario involving a mobile terminal served by a "logical" cell A, which is normally associated with physical transmissions from cell-sector AA, which in turn corresponds to a particular antenna or array of antennas at a first cell site. Sometimes a PDSCH associated with this logical cell A needs to be transmitted for at least one subframe from cell-sector BB, at a second cell site, which normally is associated with a logical cell B. However, cell sector BB is also transmitting a broadcast channel, BCH, corresponding to logical cell B. Thus, for at least this one subframe, sector BB transmits signals for mobile stations being served by logical cell B as well as the coordinated signal transmission associated with logical cell A. However, if logical cell A is using a different reference signal shift than logical cell B (because transmissions from logical cell A are normally mapped to a physical cell site neighboring the cell site carrying cell B transmissions), then sector BB will on some resource elements carry transmissions both for common reference signals for logical cell B and PDSCH transmissions associated with logical cell A. Thus, there is a data-to-reference-signal collision problem, causing high interference.

In particular, there are a number of different, albeit related, interference scenarios arising from the coordinated transmission. First, because both sector AA and sector BB are transmitting PDSCH according to logical cell A's mapping, at least in some resource block pairs, then strong interference from the logical cell A PDSCH signals is seen on the cell-specific reference signals for logical cell B. Especially for cell-center mobile stations, this can be a big problem. Normally, a mobile station near a sector transmitter enjoys high SINRs, and can therefore sustain very high data rates. However, with strong interference to logical cell B's cell-specific reference signals, caused by a coordinated PDSCH transmission corresponding to logical cell A, the channel estimation accuracy in a cell-center mobile station is likely to be significantly impaired.

Conversely, the transmission from cell-sector BB of cell-specific reference signals for logical cell B interferes with the coordinated transmission of PDSCH for logical cell A. Compared to the former case, this may be somewhat less of a problem, since the logical cell A PDSCH transmission is likely to serve a mobile station that is not too far from the border between the physical areas normally covered by cell-sectors AA and BB. (Otherwise, the mobile station would likely be associated with logical cell B.) Thus, the interference from logical cell B reference signals is not worse than the inter-cell interference normally encountered in a classical cellular deployment. However, one important goal of coordinated multi-point transmissions is to avoid low SINRs at the cell edge; this interference mechanism works against this goal.

Therefore, it is an object of some embodiments of the invention to mitigate the problems described above. This is achieved by enabling transmission of PDSCH (possibly including associated UE-specific reference signals) according to a resource mapping that is compatible with the mapping used in a cell other than the serving cell. Specifically, it should be possible to use a mapping of PDSCH data symbols to the LTE time-frequency grid according to a pattern that corresponds to a reference-signal frequency shift different than that used by the serving cell (i.e., the cell to which the PDSCH is associated). In some embodiments, the mapping of the PDSCH data symbols to the LTE time-frequency grid may also be adjusted to accommodate a differently-sized control channel (e.g., to accommodate the fact that a neighboring cell uses three OFDM symbols for PDCCH, while the serving cell uses only two).

In support of this approach, appropriate signaling may be added, in some embodiments, to support dynamic adaptation of the mentioned PDSCH mapping. More specifically, signaling may be added to inform a receiving mobile station about the mapping used for a particular PDSCH transmission. In other words, this additional signaling informs the mobile station of which of several possible PDSCH mappings that the mobile station should use when extracting PDSCH data symbols from the OFDM time-frequency grid and decoding the PDSCH. In some embodiments, this additional signaling could be part of the PDCCH, such as the part of the PDCCH carrying scheduling information for the mobile station.

FIGS. 4A and 4B provide a general illustration of this technique according to several possible embodiments of the invention. BS1 corresponds to a first cell site and is the serving cell in each of FIGS. 4A and 4B; mobile station 410 thus continuously monitors the control channel, PDCCH, transmitted from BS1. On the other hand, PDSCH may from time to time be transmitted from either BS1, as in FIG. 4A, or from BS2, at a neighboring cell site, as in FIG. 4B. (Of course, a given base station may include radio equipment and corresponding antennas for multiple cell sectors—for simplicity, only a single cell sector for each base station is discussed here.) In embodiments of the present invention, PDCCH carries control signaling that informs mobile station as two which mapping is used for the current transmission of PDSCH. Thus, in FIG. 4A the PDCCH may indicate that a first mapping, corresponding to the mapping normally used by BS1, should be used when extracting PDSCH data from the received signal and decoding the PDSCH. In FIG. 4B, however, the PDCCH may indicate that a second mapping, corresponding to the mapping normally used by BS2, should be used instead. As the transmission of the PDSCH may dynamically switch between BS1 and BS2, mobile station 410 dynamically changes its de-mapping process as well.

The additional signaling described above can be implemented in various ways. In one exemplary embodiment of the present invention, the PDCCH contains a bit field describing the reference-signal frequency shift that the receiving mobile station should assume has been used in mapping the PDSCH to the resource elements of the resource grid. In other words, this bit field indicates the mapping pattern that the mobile station should use when extracting user data from the time-frequency resource grid of the received signal. The size of this bit field may vary, in some embodiments, or be fixed, in others. For base stations configured to use two or four cell-specific antenna ports, there are only three possible reference signal shifts, and thus two bits would suffice. On the other hand, systems configured to use one cell-specific antenna ports may need to use a control element comprising three bits. In either case, assuming a UE-specific reference signal is being used, the resource elements utilized in the PDSCH transmission can then be made compatible with the site and/or sector from which the PDSCH transmission is being performed, thus avoiding collisions between the PDSCH data symbols and the cell-specific reference signals transmitted from the transmitting cell site.

A similar approach may be used for taking the control-region size into account for PDSCH transmissions using UE-specific reference signals. Thus, in some embodiments of the invention, the PDCCH contains an additional control element that signals the number of OFDM symbols that the mobile station should assume for the control region when determining to what set of resource elements the PDSCH has been mapped. In some embodiments, this additional control element may be jointly coded with the control element that indicates the reference-signal frequency shift. Alternatively, this signaling (as well as the signaling indicating the reference signal shift) could be performed by means of higher layer signaling, such as Radio Resource Control (RRC) signaling.

Figure 5:
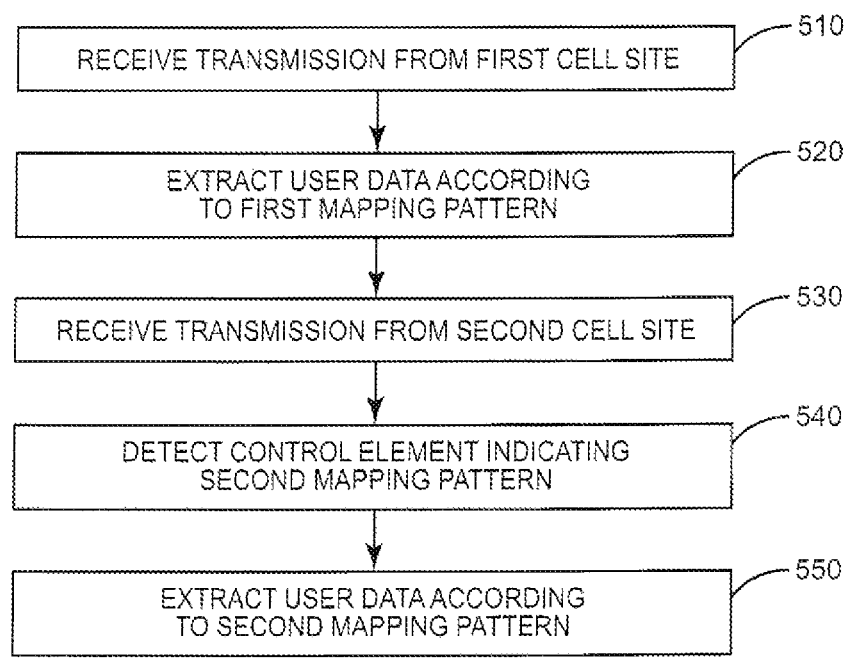
FIG. 5 is a process flow diagram illustrating an exemplary method for receiving user data in a wireless communication system employing coordinated multi-point transmission.

With the preceding discussion of the application of the present invention to an LTE system in mind, those skilled in the art will appreciate that FIG. 5 illustrates a general method, such as may be implemented in a wireless terminal, for receiving user data in a wireless communication system that employs coordinated multi-point transmission of the user data from a first cell serving the wireless terminal and a second cell site neighboring the first cell site. In this system, the first cell site maps control signals and user data to time-frequency resources according to a first mapping pattern, while the second cell site maps control data and traffic data to the time-frequency resources according to a second mapping pattern. The control signals may include common reference signals, UE-specific reference signals, synchronization signals, and the like.

The illustrated method thus begins, as shown at block 510, with the receiving of a transmission from the first cell site. This step may include, of course, monitoring a control channel from the first cell site to detect a specific allocation of resources. In the case of an LTE system, this allocation would designate specific resource blocks targeted to the mobile station.

As shown at block 520, the method continues with the extracting of user data from the received data transmission according to the first mapping pattern, i.e., the pattern used by the first cell site to map the user data and control data to the transmission. In some embodiments, the mobile station may determine which mapping pattern should be used for this particular transmission according to conventional methods, such as by determining a reference shift from the broadcast cell ID transmitted by the first cell site. In others, the mobile station may determine which mapping pattern should be used by detecting one or more specific control elements, perhaps included in a downlink resource assignment transmitted by the first cell site. This control element (or elements) may index one of the several possible reference shifts, for example, and/or indicate how many OFDM symbols are dedicated to the downlink control channel.

As shown at block 530, the method continues with the receiving of a transmission from the second cell site. Those skilled in the art will appreciate that the mobile station need not "know" that this transmission is coming from the second cell site, as the mobile station continues to receive its downlink resource assignments from the control channel transmitted by the first cell site. However, as discussed in detail above, this transmission from the second cell site includes traffic data and control signals (such as reference signals) mapped to the time-frequency resources according to the second mapping pattern, which differs from the first.

As shown at block 540, the mobile station learns that this is the case by detecting a control element indicating that the second mapping pattern is currently used. As noted earlier, this control element might be included, for example, in one or more bits of a downlink resource-allocation message, or elsewhere in the control channel. In some embodiments, the control element indicates one of a plurality of pre-determined shift patterns for common reference signals interspersed among time-frequency resources mapped to user data. In some embodiments, the control element further indicates that the second mapping pattern maps user data to one or more fewer OFDM symbols than the first mapping pattern, e.g., because the second cell site dedicates more OFDM symbols to the downlink control channel.

In some embodiments, this control element might only be used for transmissions that are mapped according to a pattern other than the "normal" pattern. In other words, the mobile station might be able to determine a default pattern, e.g., using the cell ID or other broadcast control information. This default pattern could then be used for all transmissions for which an additional control element is not received, e.g., for all transmissions from the serving cell site. In these embodiments, the detection of the additional control element would signal the mobile station that a second mapping pattern should be used instead. However, in other embodiments, this additional control element can be transmitted with every resource assignment, so that the mobile station always determines the appropriate mapping pattern to use from the additional control element.

In any case, as shown at block 550, the process illustrated in FIG. 5 continues with the extracting of user data from the transmission received from the second cell site, according to the second mapping pattern. The illustrated procedure may be repeated as many times as necessary, with dynamic switching between transmissions from the first cell site and the second cell site as propagation conditions change, as the mobile station moves, or as the interference environment changes.

Those skilled in the art will appreciate, then, that the techniques discussed above facilitate the mapping of PDSCH (or similar) transmissions onto a time-frequency resource grid using a different mapping pattern than used in the serving cell (i.e., the logical cell to which the PDSCH is associated with). Similarly, the control-region size may also be assumed to be different. Those skilled in the art will also appreciate that this may be particularly beneficial for PDSCH transmissions using UE-specific reference signals, since this allows the PDSCH to be transmitted from another cell site than normally used as the serving cell site, while completely avoiding collisions with transmissions from the other cell site. Coordinated scheduling with fast sector selection could in this way be implemented without causing high interference to mobile stations relying on cell-specific reference signals. Likewise, the interference from the cell-specific reference onto the mentioned PDSCH disappears. Thus, in various embodiments of the method illustrated in FIG. 5, the first and second transmissions, from the first and second cell sites, respectively, are during non-coincident (i.e., non-overlapping) time intervals.

On the other hand, the techniques illustrated in FIG. 5 may also be applied to COMP systems utilizing joint transmission, in which case the first and second transmissions discussed above may be at least partially overlapping in time. In some of these embodiments, the mobile station may be configured to separate the first and second transmissions using space-time diversity processing, spatial de-multiplexing processing, or the like.

For joint transmission from multiple cell sites (corresponding to multiple logical cells) that use different reference signal frequency shifts, reference-signal collisions with PDSCH are inevitable. However, the signaling of reference-signal frequency shift information for PDSCH mapping according to the above-described techniques provides the eNodeB with the opportunity to select a shift, for a given PDSCH transmission, that causes the least amount of interference. For instance, perhaps one of the cells in a COMP cluster does not have any mobile stations relying on cell-specific reference signals for their PDSCH reception. In this case, using a reference-signal frequency shift corresponding to that cell may then reduce the negative impact of the transmitted PDSCH to reference signals. Furthermore, the ability to dynamically signal an indicator of the control region size for the purpose of PDSCH mapping may also be beneficial in that the control-region size may vary from one cell site to another within the COMP cluster, while the PDSCH mapping for the mobile stations participating in the COMP transmission could be assuming a control region size equal to the maximum control region size currently used within the COMP cluster.

Finally, the above mentioned PDSCH mapping flexibility could be used in conjunction with COMP based on cell-specific reference signals as well. However, for that case, the mobile station may need to know the cell ID of the cell sites participating in the COMP transmission, in order to estimate the channels. Thus, in these cases the reference-signal frequency shift that the mobile station should use in de-mapping PDSCH transmissions from the downlink time-frequency grid may alternatively be signaled implicitly via the cell ID, while an indication of the control-region size would still be explicitly signaled unless it can be assumed that the mobile station is able to decode the control-channel format indicator (PCFICH, in LTE systems) giving the control-region size of the non-serving cell sites in the COMP cluster.

Figure 6:
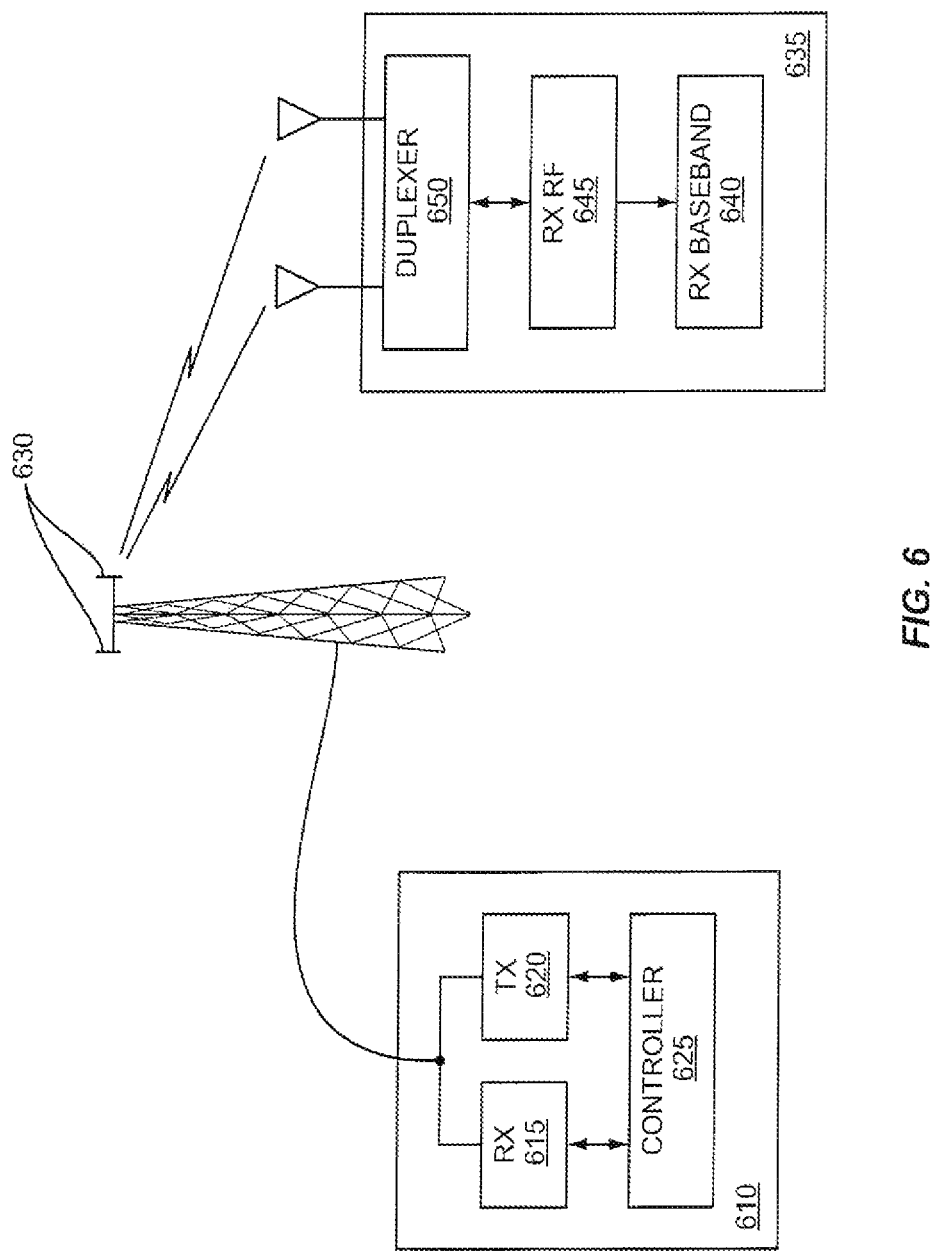
FIG. 6 is a schematic illustration of components of a wireless communication system according to some embodiments of the invention.

Those skilled in the art will appreciate that the techniques described above, although generally described in the context of an LTE system, may more generally be implemented in a variety of wireless apparatus adapted for use in a wireless communication system that employs coordinated multi-point transmission. FIG. 6 is a schematic diagram illustrating the functional components of such a system, including a transmitting node 610 connected to a cell site 630, and a wireless terminal 635.

Transmitting node 610 includes a receiver section 615 and transmitter section 620, each of which may be design, according to well-known design techniques, for compatibility with one or more wireless standards (such as LTE). Transmitting node 610 further includes a controller section 625, which again may be designed, according to well-known design techniques, to implement one or more wireless standards. In particular, controller 625 may be configured to map user data to downlink time-frequency resources according to a first mapping pattern, for a transmission to wireless terminal 635. However, controller 625, which may include one or more microprocessors or the like, configured with appropriate software and/or firmware, may further be configured to transmit an additional control element to the wireless terminal, specifically indicating that user data associated with the control element is mapped to the time-frequency resources according to the first mapping pattern. As noted above, this control element may be included in or associated with a downlink resource allocation message, such that transmitting the control element comprises transmitting the downlink resource allocation message.

Like transmitting node 610, wireless terminal 635 may be designed, according to well-known design techniques, for compatibility with one or more wireless standards, such as LTE. Thus, in some embodiments, wireless terminal 635 includes a duplexer 650, a radio-frequency (RF) receiver (RX) section 645, and RX baseband circuit 640, each of which may generally be configured according to conventional means. However, RX baseband circuit 640 is further configured, according to some embodiments of the invention, to carry out one or more of the inventive techniques described above. In particular, RX baseband circuit 640 is configured, in several embodiments of the invention, to extract user data according to a first mapping pattern from time-frequency resources of a first transmission for the wireless terminal 635 transmitted from a first cell site, to detect a control element transmitted by one of the first and second cell sites, the control element indicating that user data associated with the control element is mapped to the time-frequency resources according to a second mapping pattern, and, in response to detecting the control element, to extract user data according to the second mapping pattern from time-frequency resources of a second transmission for the wireless terminal 635 transmitted from a second cell site.

Figure 7:
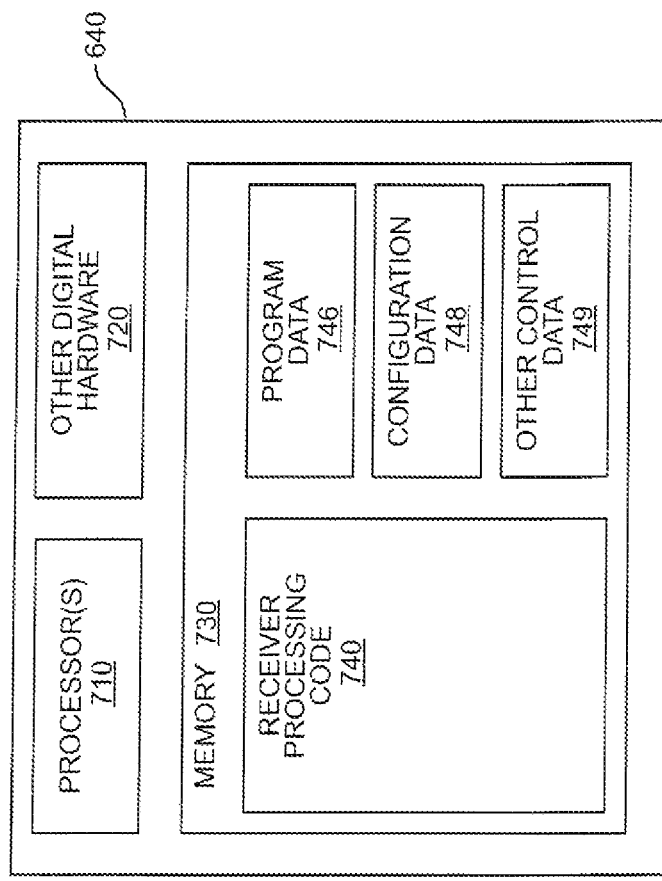
FIG. 7 is a block diagram illustrating functional components of an exemplary processing circuit configured according to some embodiments of the invention.

FIG. 7 provides some details of an exemplary receiver circuit 640, including one or more processors 710 (which may include one or more microprocessors, microcontrollers, digital signal processors, or the like) and other digital hardware 720 (including, for example, customized signal processing logic). Either or both of processors 710 and other digital hardware 720 may be configured with software and/or firmware stored in memory 730. In particular, this software includes receiver processing code 740, which comprises instructions for carrying out one or more of the techniques described above. Memory 730 may also include other processing code (not shown), as well as program data 746, configuration data 748, and other control data 749, some of which may be stored in a random-access memory (RAM) or flash memory.

More generally, those skilled in the art will appreciate that receiver circuit 640 may comprise any of a variety of physical configurations, such as in the form of one or more application-specific integrated circuits (ASICs). Other embodiments of the invention may include computer-readable devices, such as a programmable flash memory, an optical or magnetic data storage device, or the like, encoded with computer program instructions which, when executed by an appropriate processing device, cause the processing device to carry out one or more of the techniques described herein for equalizing received signals in a communications receiver.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method in a wireless terminal for receiving user data in a wireless communication system enabling coordinated multipoint transmission of the user data on a Physical Downlink Shared Channel (PDSCH) from a first cell site serving the wireless terminal and a second cell site neighboring the first cell site, wherein the first cell site maps control signals and user data to a plurality of time-frequency resources according to a first mapping pattern and the second cell site maps control signals and user data to the plurality of time-frequency resources according to a second mapping pattern, the method comprising: extracting user data, according to the first mapping pattern, from time-frequency resources of a first transmission for the wireless terminal transmitted from the first cell site; detecting a control element transmitted by the first cell site, the control element indicating that user data associated with the control element is mapped to the time-frequency resources according to the second mapping pattern, wherein the control element comprises at least one of reference-signal frequency shift information of the second cell site and a number of Orthogonal Frequency Division Multiplexing (OFDM) symbols explicitly signaled for a control region of the second cell site; and responsive to said detecting, extracting user data according to the second mapping pattern from time-frequency resources of a second transmission for the wireless terminal transmitted from the second cell site.

2. The method of claim 1, wherein the control signals comprise one or more of control-channel data, cell-specific reference signals, user-equipment-specific reference signals, and synchronization signals.

3. The method of claim 1, wherein detecting the control element comprises decoding one or more bits of a received downlink resource-allocation message.

4. The method of claim 1, wherein the control element indicates one of a plurality of pre-determined shift patterns for common reference signals interspersed among the time-frequency resources mapped to user data.

5. The method of claim 1, wherein the control element further indicates that the second mapping pattern maps user data to one or more fewer OFDM symbols than the first mapping pattern.

6. The method of claim 1, wherein the first and second transmissions occur during first and second non-coincident transmission time intervals.

7. The method of claim 1, wherein the first and second transmissions at least partially overlap in time, and wherein the method further comprises separating the first and second transmissions using one of space-time diversity processing and spatial de-multiplexing processing.

8. The method of claim 1, wherein the control signals comprise user-equipment-specific reference signals interspersed among the time-frequency resources mapped to user data according to the second mapping pattern, and wherein the method further comprises extracting the user-equipment-specific reference signals from the second transmission according to the second mapping pattern.

9. A wireless terminal for use in a wireless communication system enabling coordinated multipoint transmission of user data on a Physical Downlink Shared Channel (PDSCH) from a first cell site serving the wireless terminal and a second cell site neighboring the first cell site, wherein the first cell site maps control signals and user data to a plurality of time-frequency resources according to a first mapping pattern and the second cell site maps control signals and user data to the plurality of time-frequency resources according to a second mapping pattern, the wireless terminal comprising a receiver circuit configured to: extract user data according to the first mapping pattern from time-frequency resources of a first transmission for the wireless terminal transmitted from the first cell site; detect a control element transmitted by the first cell site, the control element indicating that user data associated with the control element is mapped to the time-frequency resources according to the second mapping pattern, wherein the control element comprises at least one of reference-signal frequency shift information of the second cell site and a number of Orthogonal Frequency Division Multiplexing (OFDM) symbols explicitly signaled for a control region of the second cell site; and in response to detecting the control element, extract user data according to the second mapping pattern from time-frequency resources of a second transmission for the wireless terminal transmitted from the second cell site.

10. The wireless terminal of claim 9, wherein the control signals comprise one or more of control-channel data, cell-specific reference signals, user-equipment-specific reference signals, and synchronization signals.

11. The wireless terminal of claim 9, wherein the receiver circuit detects the control element by decoding one or more bits of a received downlink resource-allocation message.

12. The wireless terminal of claim 9, wherein the control element indicates one of a plurality of pre-determined shift patterns for cell-specific reference signals interspersed among the time-frequency resources mapped to user data.

13. The wireless terminal of claim 9, wherein the control element further indicates that the second mapping pattern maps user data to one or more fewer OFDM symbols than the first mapping pattern.

14. The wireless terminal of claim 9, wherein the first and second transmissions occur during first and second non-coincident transmission time intervals.

15. The wireless terminal of claim 9, wherein the first and second transmissions at least partially overlap in time, and wherein the receiver circuit is further configured to separate the first and second transmissions using one of space-time diversity processing and spatial de-multiplexing processing.

16. The wireless terminal of claim 9, wherein the control signals comprise user-equipment-specific reference signals interspersed among the time-frequency resources mapped to user data according to the second mapping pattern, and wherein the receiver circuit is further configured to extract the user-equipment-specific reference signals from the second transmission according to the second mapping pattern.

17. A method for transmitting user data, in a transmitter node of a first cell site in a wireless communication system enabling coordinated multipoint transmission of user data on a Physical Downlink Shared Channel (PDSCH) from the first cell site and a second cell site serving a wireless terminal and neighboring the first cell site, the method comprising: mapping user data, according to a first mapping pattern, to time-frequency resources of a first transmission for the wireless terminal transmitted from the first cell site; and transmitting a control element indicating that user data associated with the control element is mapped to the time-frequency resources according to a second mapping pattern, wherein the control element comprises at least one of reference-signal frequency shift information of the second cell site and a number of Orthogonal Frequency Division Multiplexing (OFDM) symbols explicitly signaled for a control region of the second cell site.

18. The method of claim 17, further comprising including the control element in a downlink resource allocation message, wherein transmitting the control element comprises transmitting the downlink resource-allocation message.

19. A transmitting node for use in a first cell site in a wireless communication system, the wireless communication system enabling coordinated multipoint transmission of user data on a Physical Downlink Shared Channel (PDSCH) from the first cell site and a second cell site serving a wireless terminal and neighboring the first cell site, the transmitting node comprising a transmitter circuit configured to: map user data, according to a first mapping pattern, to time-frequency resources of a first transmission for the wireless terminal transmitted from the first cell site; and transmit a control element indicating that user data associated with the control element is mapped to the time-frequency resources according to a second mapping pattern, wherein the control element comprises at least one of reference-signal frequency shift information of the second cell site and a number of Orthogonal Frequency Division Multiplexing (OFDM) symbols explicitly signaled for a control region of the second cell site.

20. The transmitting node of claim 19, wherein the transmitter circuit is further configured to include the control element in a downlink resource allocation message and to transmit the control element by transmitting the downlink resource-allocation message.

* * * * *